US007219344B2

(12) United States Patent
Chenelle et al.

(10) Patent No.: US 7,219,344 B2
(45) Date of Patent: May 15, 2007

(54) METHOD AND APPARATUS FOR DEPLOYING PROGRAMS AND COMPUTING PLATFORMS TO SELECTED COMPUTERS

(75) Inventors: Michael A. Chenelle, Painesville, OH (US); Timothy A. Gaughan, Washington Crossing, PA (US); Russell H. Gowland, Midland, MI (US); Steven E. Gratto, Chagrin Falls, OH (US); Peter J. Henry, Broadview Heights, OH (US); Jeffrey J. Kavlick, Aurora, OH (US); Paul A. Kline, Midland, MI (US); Dan A. Nugent, Canton, MI (US); Bruce L. O'Connor, Alto, MI (US); Michael J. Sivo, Sheffield Lake, OH (US)

(73) Assignee: Accenture Global Services GmbH, Schaffhausen (CH)

( * ) Notice: Subject to any disclaimer, the term of this patent is extended or adjusted under 35 U.S.C. 154(b) by 439 days.

(21) Appl. No.: 10/135,328

(22) Filed: Apr. 30, 2002

(65) Prior Publication Data

US 2003/0204842 A1    Oct. 30, 2003

(51) Int. Cl.
  G06F 9/445 (2006.01)
  G06F 9/44 (2006.01)
(52) U.S. Cl. .................. 717/177; 717/168; 717/171; 717/172; 717/173
(58) Field of Classification Search ........ 717/168–178, 717/121; 705/14; 709/223, 221; 713/182; 707/203; 714/748
  See application file for complete search history.

(56) References Cited

U.S. PATENT DOCUMENTS

| | | | | |
|---|---|---|---|---|
| 4,912,637 A * | 3/1990 | Sheedy et al. | ............... | 707/203 |
| 5,809,251 A * | 9/1998 | May et al. | ................... | 709/223 |
| 5,835,911 A * | 11/1998 | Nakagawa et al. | ......... | 707/203 |
| 5,974,454 A * | 10/1999 | Apfel et al. | ................ | 709/221 |
| 6,256,773 B1 * | 7/2001 | Bowman-Amuah | ......... | 717/121 |
| 6,457,176 B1 * | 9/2002 | King | .......................... | 717/173 |
| 6,606,744 B1 * | 8/2003 | Mikurak | ..................... | 717/174 |
| 6,629,284 B1 * | 9/2003 | Leermakers | ................ | 714/748 |
| 6,771,290 B1 * | 8/2004 | Hoyle | ........................ | 715/745 |
| 7,080,051 B1 * | 7/2006 | Crawford | .................... | 705/400 |
| 2001/0052121 A1 * | 12/2001 | Masuda et al. | ............... | 717/11 |
| 2002/0095485 A1 * | 7/2002 | Maekawa et al. | ........... | 709/223 |
| 2002/0157090 A1 * | 10/2002 | Anton, Jr. | ................... | 717/178 |
| 2002/0174010 A1 * | 11/2002 | Rice | ............................ | 705/14 |
| 2002/0188942 A1 * | 12/2002 | Bryan et al. | ................ | 717/176 |
| 2003/0009752 A1 * | 1/2003 | Gupta | ........................ | 717/171 |
| 2003/0079132 A1 * | 4/2003 | Bryant | ....................... | 713/182 |

(Continued)

OTHER PUBLICATIONS

Han et al., Secure multicast software delivery, Proeedings. IEEE 9th International Workshops on, Jun. 14-16, 2000, pp. 207-212.*

(Continued)

*Primary Examiner*—Ted T. Vo
*Assistant Examiner*—Satish S. Rampuria
(74) *Attorney, Agent, or Firm*—Hogan & Hartson LLP (57) ABSTRACT

Management of computer software in an enterprise includes receiving program requests from client computers associated with different enterprises. The program requests are validated and at least one requested program is sent from a database to at least one client computer.

18 Claims, 5 Drawing Sheets

U.S. PATENT DOCUMENTS

| | | | |
|---|---|---|---|
| 2004/0015946 A1* | 1/2004 | Te'eni et al. | 717/169 |
| 2004/0044999 A1* | 3/2004 | Gibson | 717/178 |
| 2004/0117785 A1* | 6/2004 | Kincaid | 717/170 |
| 2004/0221284 A1* | 11/2004 | Costello et al. | 717/172 |
| 2005/0027846 A1* | 2/2005 | Wolfe et al. | 709/223 |

OTHER PUBLICATIONS

Perry, Air traffic control: a system-wide upgrade races to replace two-decade-old equipment, Spectrum, IEEE, vol. 28, Issue: 2, Feb. 1991, pp. 22-27.*

Fox, Software Reviews—IDL data visualization broadly upgraded, Spectrum, IEEE, vol. 36, Issue: 6, Jun. 1999, pp. 93-94.*

Lizhou et al., A framework for live software upgrade, IEEE, 2002 pp. 149-158.*

Murray et al., Re-hosting the operational flight program for a tactical fighter plane's radar data processor: a software upgrade methodology, IEEE, May 1996 pp. 490-496 vol. 2.*

Stewart et al., Dynamically reconfigurable embedded software-does it make sense!, IEEE, Oct. 1996 pp. 217-220.*

Li et al., A case study of dependable software upgrade with distributed components, IEEE, 2002 pp. 1028-1033.*

* cited by examiner

METHOD AND APPARATUS FOR DEPLOYING PROGRAMS AND COMPUTING PLATFORMS TO SELECTED COMPUTERS

TECHNICAL FIELD

This invention relates to computer software management, and more particularly to a method and apparatus for deploying programs and computing platforms to computers associated with different enterprises.

BACKGROUND

A typical enterprise may have a large number of computers distributed over wide geographic areas spanning across different cities or countries. Each of the computers can be configured with a computing platform that may include different and often incompatible hardware components or software components such as different operating systems or application programs. The computing platform may have to be upgraded or replaced with a new computing platform because the current computing platform may have become obsolete.

To deploy a program or a new computing platform onto one or more client computers distributed across an enterprise often requires overcoming a large number of logistical problems. Factors such as the number and type of client computers in the enterprise must be considered. Moreover, it may be difficult to gather and analyze information related to the requirements of all the client computers in an enterprise.

SUMMARY

In one implementation, a first aspect of the invention includes receiving program requests from client computers associated with different enterprises. The validity of the program requests is determined and at least one requested program is sent from a database to at least one client computer.

The aforesaid method may include checking whether the client computers are authorized to access the programs indicated in the program requests. The client computers may be sent a list of programs that the computers are authorized to receive. The availability of the requested programs may be determined by comparing programs that the client computers have received with the programs that the client computers are authorized to receive. The database may be updated to indicate the client computer that has received a program. The database may be located in an enterprise different from the enterprise associated with the client computers.

In a second aspect, the invention provides an apparatus adapted to perform the methods disclosed in the first aspect.

In a third aspect, the invention provides an article comprising a computer-readable medium that stores computer executable instructions for causing a computer to perform the methods disclosed in the first aspect.

In a fourth aspect, the invention provides a method that includes accessing a system configured to perform the methods in disclosed in the first aspect.

In another implementation, a fifth aspect of the invention discloses a method that includes targeting a group of client computers in at least one enterprise to receive at least one program. A notification is sent to the client computers in the group that is to receive at least one program. At least one program is sent to the client computers in the group who have accepted receipt of the program. The program is sent from a database located in one enterprise to the group of client computers located in another enterprise.

The above method may include updating the database to indicate the client computer that has received a program. The notification may include information indicating a time limit within which the program is to be sent to the client computers. The database may be located in an enterprise different from the enterprise associated with the client computers.

In a sixth aspect, the invention provides an apparatus adapted to perform the methods disclosed in the fifth aspect.

In a seventh aspect, the invention provides an article comprising a computer-readable medium that stores computer executable instructions for causing a computer to perform the methods disclosed in the fifth aspect.

In an eighth aspect, the invention provides a method that includes accessing a system configured to perform the methods disclosed in the fifth aspect.

In yet another implementation, a ninth aspect of the invention discloses a method that includes receiving a request for a computing platform from a client computer over a network, wherein the request includes configuration information of the client computer. In response to the request, the method provides the computing platform. The client computer is sent the computing platform which includes the received configuration information and a hardware independent software image of a computing platform.

The aforesaid method may include modifying the hardware independent software image based on client computer requirements. The hardware independent software image may include a hardware independent portion and a hardware dependent portion. The independent portion may include a software image of a test computer and the hardware dependent portion may include hardware dependent programs. The computing platform may include a program to determine the hardware configuration of the client computers. The hardware independent software image of the new computing platform may be created by installing an operating system and application programs onto a test computer.

In a tenth aspect, the invention provides an apparatus adapted to perform the methods disclosed in the ninth aspect.

In an eleventh aspect, the invention provides an article comprising a computer-readable medium that stores computer executable instructions for causing a computer to perform the methods disclosed in the ninth aspect.

In a twelfth aspect, the invention provides a method that includes accessing a system configured to perform the methods disclosed in the ninth aspect.

In various implementations, the invention may provide one or more of the following advantages. The program deployment process can automate the process of deploying programs to client computers in an enterprise. Such a process may obviate the need for manually distributing programs or for creating distribution applications for each enterprise. The invention also may reduce the burden of software distribution on an enterprise by providing an infrastructure for distributing programs among client computers in different enterprise. These techniques may improve the efficiency of distributing programs because it can leverage a single infrastructure among one or more different enterprises. The process also may exploit the use of the Internet infrastructure by using standard Internet based protocols to perform its task. As a result, the overall cost of updating programs in an enterprise may be reduced.

The program deployment process also can track the usage of programs among the client computers which may important for asset management purposes such a licensing. The process can be implemented as standalone process or combined with a current deployment structure of an enterprise. The process can "pull" application programs to a client computer in response to requests from the computers. Moreover, the process also can "push" application programs to the client and provide several types of time frames in which the client can receive the programs. Consequently, network traffic due to programs distribution from a centralized database to client computers in an enterprise may be reduced.

The invention also may provide one or more of the following advantages. The computing platform process can create a computing platform that may be independent of the specific hardware requirements of client computers in an enterprise. The process can gather in a central location a repository of hardware dependent programs such as device drivers from manufacturers of hardware components of a client computer. As a result, a new computing platform can be created that can reduce the need for information technology (IT) personnel to physically check each of the client computers in an enterprise.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
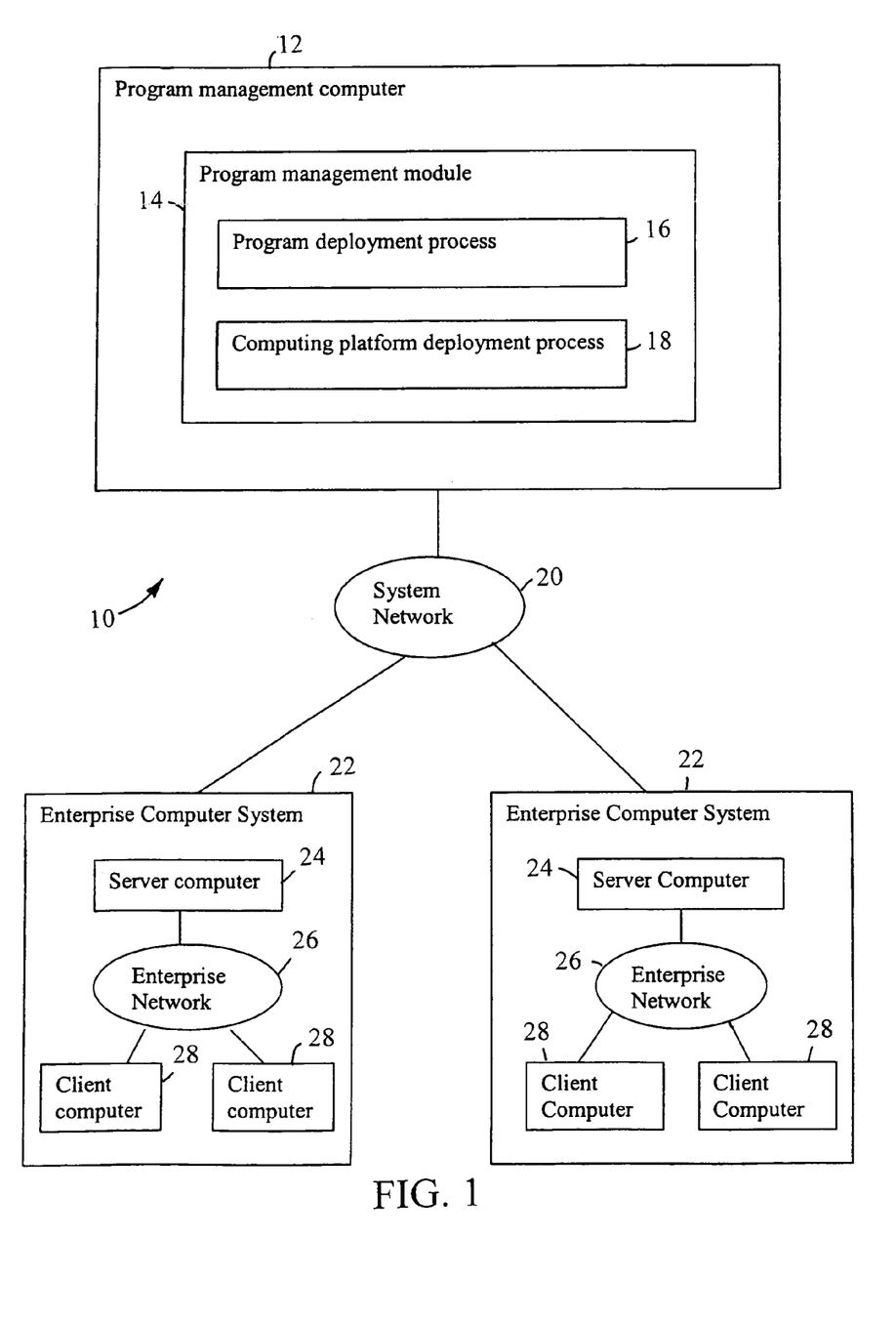
FIG. 1 is a simplified block diagram of a program management system according to an implementation of the invention.

FIG. 1 is a simplified block diagram of a program management system 10 according to an implementation of the invention. The management system 10 includes a program management computer 12 that communicates with one or more enterprise computer systems 22 over a system network 20. An example of a system network 20 can include a wired or wireless network such as the Internet, the World Wide Web, or other network. The management computer 12 includes a program management module 14 having a program deployment process 16 and a computing platform deployment process 18. The program process 16 is responsible for managing the deployment of programs onto the enterprise systems 22. Similarly, the platform process 18 handles the deployment of a computing platform onto the enterprise systems 22.

Each of the enterprise systems 22 include a server computer 24 that handles one or more client computers 28 over an enterprise network 26. The server computer 24 facilitates communication between the client computers 28 and the management computer 12 over the enterprise network 26 and the system network 20. Each enterprise system 22 belongs to a separate domain protected by a firewall from the other enterprise systems and from the system network 20. Similarly, the management computer 12 is associated with an enterprise different from the enterprise systems 22. For example, the management computer 12 can be associated with an enterprise having a corporate identity different from that of the client computers 28 and the enterprise systems 22.

In each enterprise system 22, the client computers 28 can issue requests for programs, such as application programs, from the management computer 12. A client computer 28 can be a personal computer (PC) such as a desktop or laptop computer executing an operating system such as Microsoft Windows XP® and using a Web browser such a Microsoft Internet Explorer® to connect to the management computer 12 over the system network 20.

The program process 16 can satisfy the requests from the client computers 28 by determining whether the request is valid and by sending the requested programs to the client computers. The program process 16 also is capable of initiating the deployment process by targeting a group of client computers 28 that are to receive programs. Likewise, the client computers 28 can issue requests for a new computing platform, such as a new operating system, from the management computer 12. The platform process 18 handles these requests by sending to the client computer 28 the computing platform along with configuration information associated with the client computer.

Figure 2:
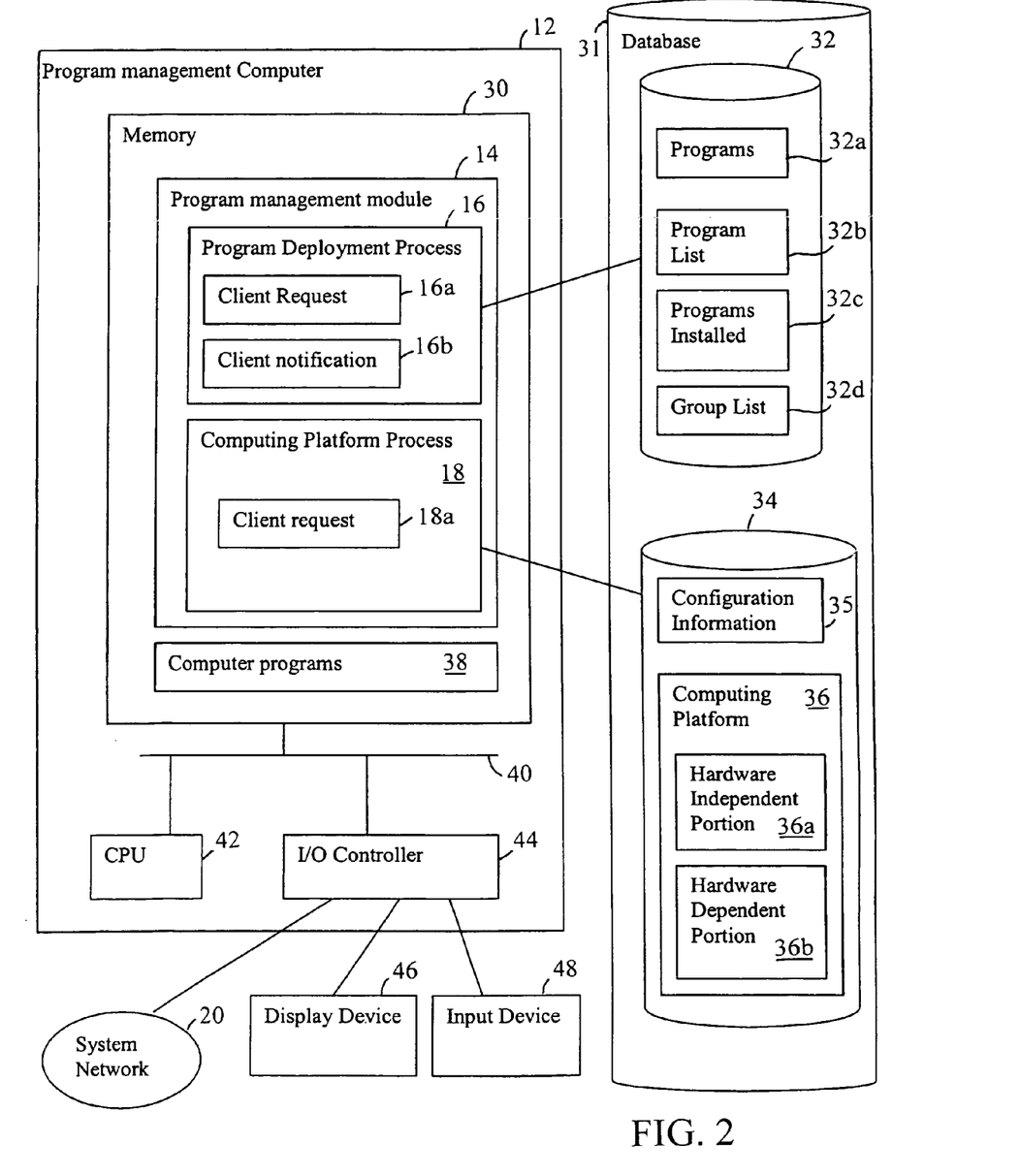
FIG. 2 is a detailed block diagram of a program management computer according to an implementation of the invention.

FIG. 2 is a detailed block diagram of a program management computer 12 according to an implementation of the invention. The management computer 12 can be implemented as a single server computer that includes a computer bus 40 connecting a central processing unit (CPU) 42 to memory 30. The CPU 42 is capable of executing computer programs 38 residing in memory 30 and processing data stored in memory. The computer programs 38 can include an operating system, such as Microsoft's Windows 2000 Server®, device drivers for handling low-level aspects of hardware components of the computer, application programs such as Microsoft Office XP® or other programs. The CPU 42 can include an Intel Pentium® processor or other processor. The memory 30 can be a combination of read only memory (ROM), random access memory (RAM), static RAM (SRAM), dynamic RAM (DRAM), or other memory.

The memory 30 contains the program management module 14 which includes the program deployment process 16 and the computing platform process 18. A database 31 can be used to store data related to the execution software in the management computer 12. In one implementation, the database 31 is used to store program process data 32 which is data related to the execution of the program process 16. Likewise, the database 31 can be used to store platform process data 34 which is data associated with the execution of the computing platform process 18. The database 31 can be implemented using a database management program such as Microsoft SQL 2000™ Oracle®, Sybase®, or other database management program.

The program process 16 is capable of handling program client requests 16*a* for programs from client computers 28, and sending client notifications 16*b* to a targeted group of client computers 28. The program process 16 uses the program process data 32 to perform its various tasks. The program process data 32 includes programs 32*a*, program lists 32*b*, program installed lists 32*c*, and group lists 32*d*. The programs 32*a* represent the programs that the program process 16 can send to the client computers 28 in response to client requests 16a for programs. The program list 32b is list of programs that is sent to the client computers 28 wherein each entry in the list indicates a program that the computer is authorized to receive. The program installed list 32c is a list of programs that the client computer 28 has received. Each client computer 28 is associated with a program list 32b and a program installed list 32c. The group list 32d is data representing a group of client computers 28 that have been targeted to receive one or more programs 32a.

The computing platform deployment process 18 handles client requests 18a for computing platforms 36 from the client computers 28 and uses the platform process data 34 in the database 31 to accomplish this task. The platform process 18 provides a computing platform 36 that includes a hardware independent portion 36a and a hardware dependent portion 36b. The hardware independent portion 36a can include a software image of a test computer that is loaded with an operating system and application programs. The hardware dependent portion 36b includes hardware dependent programs such as device drivers. There can be one or more computing platforms 36 depending on the requirements of the enterprise systems 22. Each client computer 28 is associated with configuration information 35 which represents the hardware and software settings of the client computer.

An input/output (I/O) controller 44 includes hardware elements, such as an interface card, and software elements, such as device drivers, connected to the computer bus 40. The I/O controller 44 is used to couple the management computer 12 to computer components such as the system network 20, a display device 46, an input device 48, or other components.

The display device 46 can include a computer display capable of displaying data related to the execution of programs in the management computer 12. For example, the display device 46 can display data associated with the execution of the computer programs 38 and the program management module 14. The input device 48 can include a pointing device such as a mouse, track ball, light pen, touch sensitive display, or other type of pointing device and may be used in combination with a keyboard to input data into the management module 14 executing on the management computer 12.

The I/O controller 44 connects the management computer 12 to the system network 20. The computer 12 is capable of communicating over a wired or wireless network such as, for example, a local area network (LAN), wide area network (WAN), Ethernet, the Internet, or other network. The operation of the computer 12 can be controlled through a local terminal connected directly to the computer 12 or a remote computer coupled to the computer 12 over the network 20.

Figure 3:
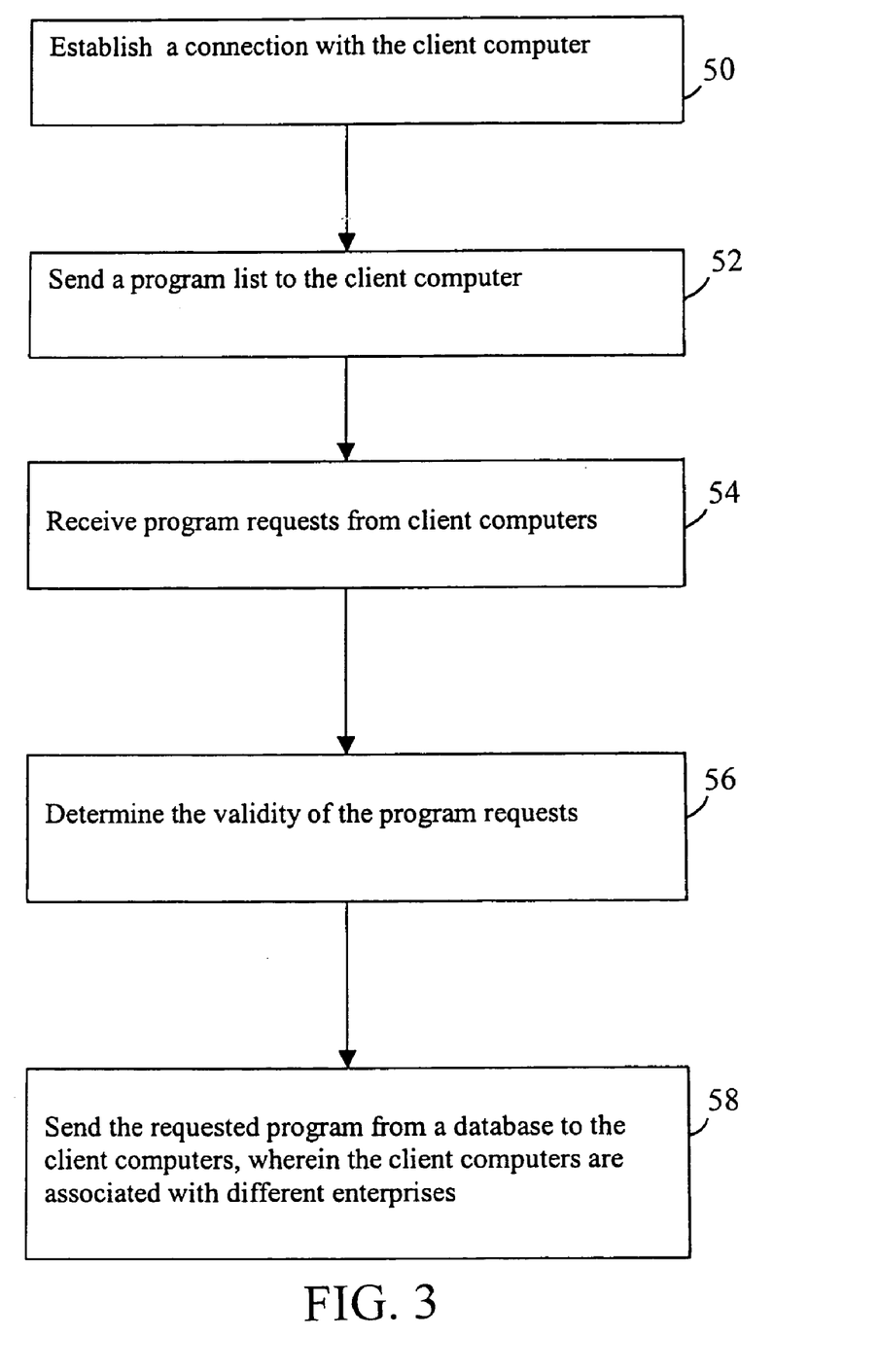
FIG. 3 is a flow chart of a program deployment process according to an implementation of the invention.

FIG. 3 is a flow chart of a program deployment process 16 according to an implementation of the invention that includes having the client computers 12 "pull" programs 32a from the database 32. The client computers 28, which are associated with different enterprises 22, connect 50 to the management computer 12 through the system network 20. In one embodiment, the connection can include a portal mechanism and a World Wide Web site provided by the management computer 12. The client computer 28 can use a communications program, such as a Web browser, to connect to the portal mechanism of the management computer 12 over the system network 20. The connection process can include a login process which can verify whether the client computer 28 is authorized to access the management computer 12. For example, information related to the client computer 28 attempting to access the management computer 12 can be compared to authorization information stored in the database 31 to determine the identity of the client computer and whether it is authorized to access the management computer 12.

Once a client computer 28 is authorized to access the management computer 12, the program process 16 sends 52 the client computer a program list 32b containing a list of the programs 32a in the database 32 that the computer is authorized to receive. In one embodiment, the program process 16 can send the program list 32b in the form of a Web page containing the list of the authorized programs. The Web page can be constructed using standard Web language and protocols such as hypertext markup language (HTML). The contents of the program list 32b can be based on the programs that the client computer 28 is authorized to access. For example, a client computer in the marketing department of an enterprise may be authorized to access programs that may be different from the programs a client computer in the manufacturing department is authorized to access.

The program process 16 receives 54 client requests 16a for programs from the client computer 28. The program requests 16a are generated by the client computer 28 when it selects one or more programs it would like to receive from the program list 32b. In one embodiment, the client computer 28 can make this selection from a Web page that contains one or more entries representing the programs 32a from the program list 32b.

Once the program process 16 receives a client request 16a for programs, the process determines 56 the validity of the program requests. This determination may include checking the availability of the programs indicated in the program request 16a. This checking procedure can include comparing programs that the client computer 28 has received in the past, as indicated by the data in the program installed 32c, with the programs that the client computer 28 is authorized to receive as indicated by the data in the program list 32b.

If the client computer 28 is authorized to receive one or more programs, the program process 16 sends 58 the programs 32a from the database 32 to the client computer. The programs 32a that are sent to the client computer can be packaged with an program module for installing the programs on the client computer 28. An example of an installation module can include a Wice interface program.

Once the programs requested by the client computer 28 have been received and installed on the client computer, the program process 16 can update a data structure in the database to indicate the client computer that has received a program. This data structure also can be a part of an asset management database used to track assets (programs) for licensing purposes. In addition, data in the programs installed 32c can be updated to indicate which programs the client computer has requested and received. As mentioned above, this data can be used to determine which programs the client computer has received.

Moreover, the client computer 28 can be sent a notification indicating the status of the program request. For example, the client computer 18 can be sent an alert in the form of an electronic mail (Email) message indicating status information including whether the request was a success or failure.

Figure 4:
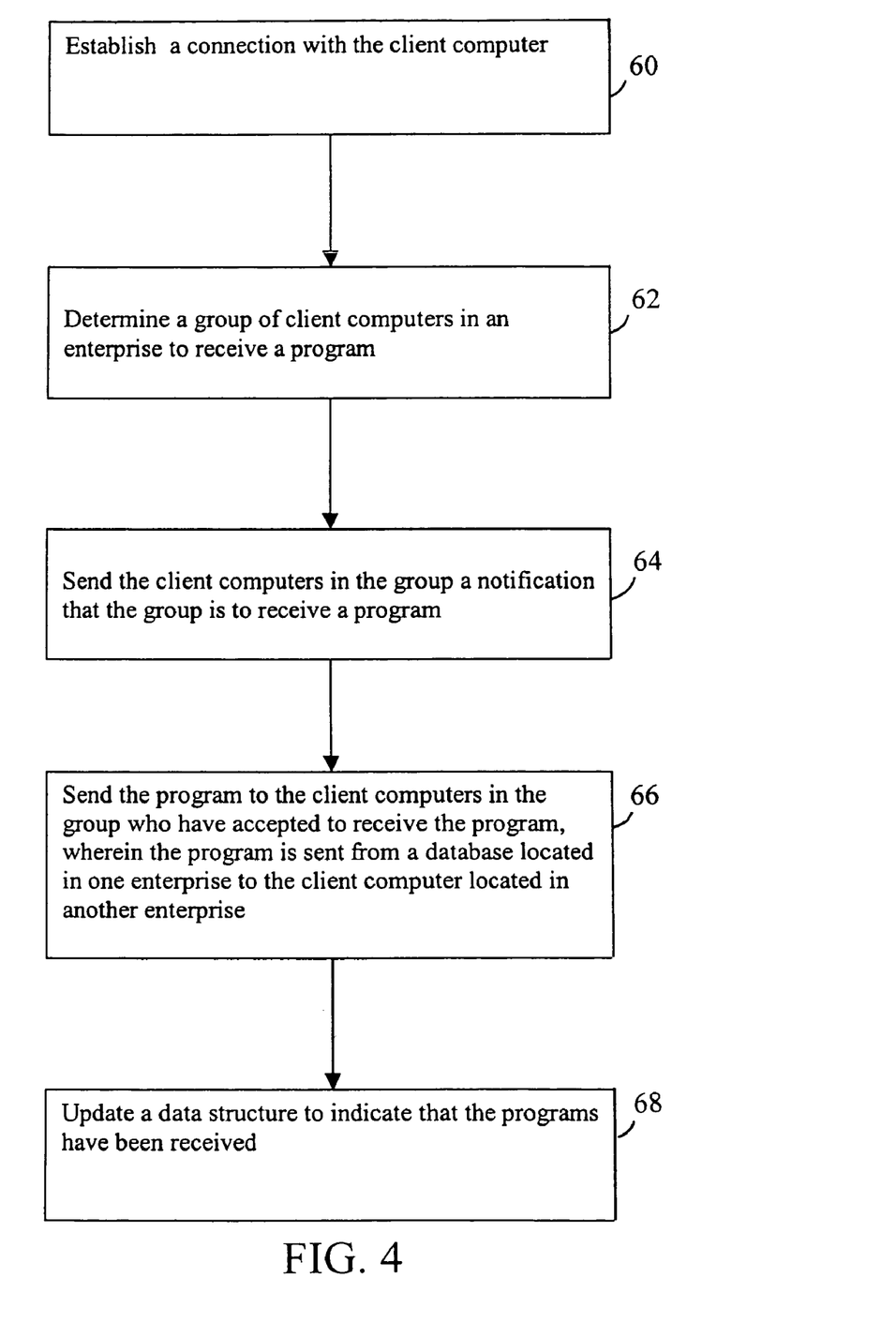
FIG. 4 is a flow chart of a program deployment process according to another implementation of the invention.

FIG. 4 is a flow chart of a program deployment process 16 according to another implementation of the invention in which programs 32a are "pushed" from the database 32 to the client computers 28. One or more client computers 28 connect 60 to the management computer 12 through the system network 20 using techniques similar to those described above. The program process 16 keeps track of the client computers that are connected to the management computer 12 using standard techniques. For example, a login process similar to the process discussed above can be used to verify whether the client computer is authorized to access the management computer 12. In addition, the program process 16 can use the login process to gather information related to the client computer and to store this information in a data structure in the database 31. The data structure can be organized to include entries for the client computers 28 in each of the enterprises 22. As a result, the identities of the client computers that are connected to the management computer 12 are obtained.

The program process 16 targets 62 a group of client computers 28 in at least one enterprise 22 to receive at least one program 32*a*. The group list 32*d* is a data structure that can be used to store the data identifying the client computers in a group. There can be one or more group list 32*d* for each enterprise 22. The members in each group list 32*d* can be selected based on criteria such as the department associated with the client computers, the software or hardware requirements of the client computers, business consideration of the enterprise, or other criteria. For example, the marketing department in an enterprise may decide that the employees in the marketing department should receive either a new program or an upgrade to a current program. As a result, the marketing department can use the deployment process 16 to create a group list 32*d* that includes the client computers associated with the employees in the department and the programs 32*a* they are to receive.

Once a group list 32*d* has been created for the targeted group, the program process 16 sends 64 a notification 16*b* to the client computers in the group that is to receive at least one program. The notification 16*b* can include a message, such as an Email or a Web page, which includes time limit information such as a time period indicating when a program is to be sent to the client computers. The notification 16*b* can indicate that the receipt of programs is mandatory. In this case, the notification 16*b* provides the client computer with one or more time periods to select from and a time limit in which the program is to be sent to the client computer. Alternatively, the notification 16*b* can indicate an optional time limit in which case the client computer is given an option to receive the program immediately or at a later time.

The program process 16 sends 66 at least one program 32*a* to the client computers 28 in the group who have accepted receipt of the program. Program process 16 sends the programs 32*a* from the database 32 to the client computers 28 that have been authorized to receive the programs. The database 32 is located in an enterprise different from the enterprise associated with the group. As mentioned above, the programs 32*a* that are sent to the client computer can be packaged with an installation module that allows the programs 32*a* to be easily installed on the client computer 28.

The client computer 28 can be sent a notification indicating the status of the program request. For example, the client computer 28 can be sent an alert in the form of an electronic mail (Email) message indicating whether the request was a success or failure. Such a notification prevents the occurrence of multiple installations.

Once the programs 32*a* have been received and installed on the client computer 28, the program process 16 updates 68 a data structure in the database to indicate the client computers in the group that have received a program. As mentioned above, this data structure also can be a part of an asset management database which can be used to track assets (programs) for licensing purposes.

Figure 5:
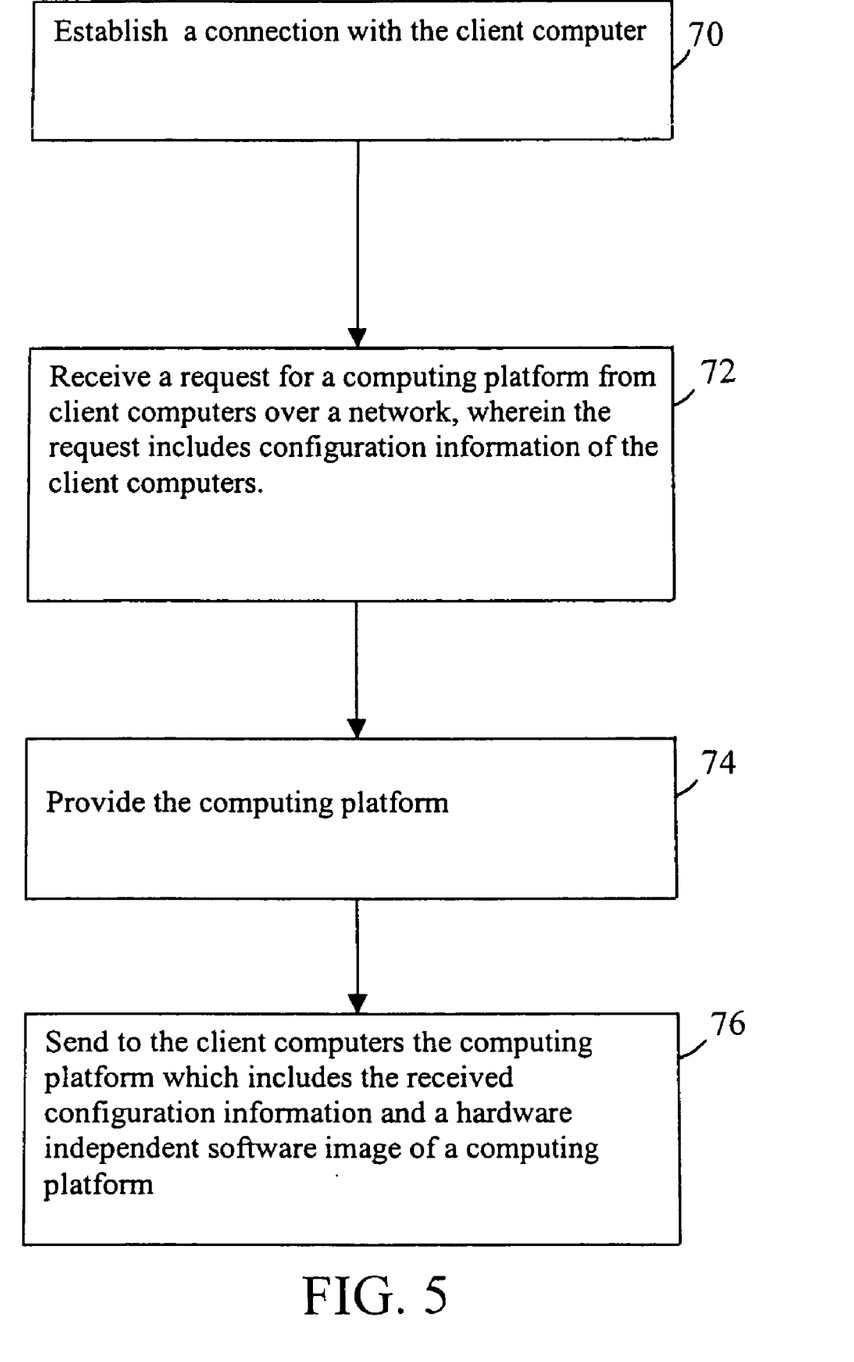
FIG. 5 is a flow chart of a computing platform deployment process according to an implementation of the invention.

FIG. 5 is a flow chart of a computing platform process 18 according to an implementation of the invention. The client computer 28 establishes a connection to the management computer in a manner similar to the manner described above. For the following description it is assumed that the client computer 28 has established a connection to the management computer and is authorized to send requests 18*a* to receive a new computing platform 36.

The platform process 18 receives 72 a client request 18*a* for a computing platform 36 from a client computer 28 over the system network 20. The request 18*a* can be accompanied with configuration information 35 associated with the client computer 28. The configuration information 35 can include hardware settings of the client computer 28 such as printer port assignments or other settings. The configuration information 35 also can include software parameters such as language type that the client computer has selected or other parameters. In one embodiment, the configuration information 35 can be captured by a program embedded in a Web page sent by the process 18 to the client computer 28.

The platform process 18 provides 74 the computing platform 36. In one implementation, a hardware independent software image of the computing platform 36 can be created by installing an operating system, one or more application programs, and device drivers onto a test computer such as a PC. As mentioned above, the computing platform 36 is a hardware independent software image of a computing platform that includes a hardware independent portion 36*a* and a hardware dependent portion 36*b*.

The independent portion 36*a* includes a software image of a test computer. An image creating program, such as Sysprep from Microsoft® can be used to create the hardware independent portion 36*a*. This program can detect the hardware aspects of the test computer and abstract these aspects by replacing specific identifiers associated with the test computer with a generic identifier. The software image can be captured and stored in storage resource as a compact disk (CD) or in the database 32. The platform process 18 can handle specific requirements of one or more enterprise systems 22 and of client computers 28. For example, a client file can be created for each enterprise or for a group of client computers in an enterprise. The client file can include information related to the enterprise such as enterprise wide settings including language settings, the graphic display resolution, printer mappings, or other settings.

The hardware dependent portion 36*b* includes hardware dependent programs such as device drivers for the hardware components of the test computer such as video cards, printers, network cards, or other components. The hardware dependent 36*b* portion can be continuously updated with device drivers provided by manufacturers of hardware components. In this way, the computing platform 36 is hardware independent and, therefore can be installed on a large number of different client computers 28.

The platform process 18 sends 76 to the client computer 28 the configuration information 35 associated with the client computer and the computing platform 36. The computing platform 36 can be packaged with software that can interface with a download manager interface of an operating system such as Microsoft Windows XP®. When the computing platform 36 is received by the client computer, the download manager executes and examines the hardware dependent portion 36*b* of the computing platform 36. The download manager evaluates the hardware aspects of the client computer 28 and determines which device drivers from the hardware dependent portion 36*b* are necessary for proper operation. The appropriate device drivers are then installed in the client computer 28.

Moreover, the computing process 18 is capable of handling post installation procedures that may not be handled by the creation of the client file. For example, the procedure can be handle custom settings such as the network drive mappings on a client computer 28. This procedure can be automated by executing a program that gathers and organizes the custom setting information from the client computers 28 in an enterprise 22. The program can then use this information to configure the settings of the client computers that require such configuration.

A number of embodiments of the invention have been described. Nevertheless, it will be understood that various modifications may be made without departing from the spirit and scope of the invention. For example, the techniques described above can be easily adapted to operate with other operating systems such as the Linux® operating system. Accordingly, other embodiments are within the scope of the following claims.

What is claimed is:

1. A method comprising:
    for each of a plurality of client computers, storing a unique identifier and at least one characteristic in a first database;
    storing a plurality of programs in a second database;
    a management server receiving a program request, said program request including a desired value for a specified characteristic and a desired program, wherein said specified characteristic is stored in the first database and said desired program is stored in the second database;
    the management server querying the first database to identify one or more of said plurality of client computers having a stored characteristic value that matches said desired characteristic value, and storing the unique identifiers of the matched client computers in a group list;
    the management server querying the second database to determine availability of and authority for said desired program to said group list;
    the management server assigning a time frame, and, within that time frame, sending the desired program from the second database to the client computers whose unique identifiers are in the group list;
    the management server recording instances of programs being sent to client computers, wherein said instance record includes the name of the program, the program version, the client computer, and the date and time of the sending; and
    tracking recorded instances of programs sent to client computers so as to verify that sending such programs is in compliance with license obligations.

2. The method of claim 1, further comprising updating the second database to indicate the client computer that has received a program.

3. The method of claim 1, wherein said management computer comprises a program management module having a program deployment process and a computing platform deployment process.

4. The method of claim 1, wherein said plurality of client computers are located in a plurality of enterprises.

5. The method of claim 1, wherein said first database is located in an enterprise and said second database is located in another enterprise.

6. The method of claim 1, further comprising notifying client computers of said assigned time frame.

7. A computer apparatus comprising: a memory, and a processor coupled to the memory, wherein the processor is configured to:
    access a first database containing for each of a plurality of client computers a unique identifier and at least one characteristic;
    access a second database containing a plurality of programs;
    receive a program request, said program request including a desired value for a specified characteristic and a desired program, wherein said specified characteristic is stored in the first database and said desired program is stored in the second database;
    query the first database to identify one or more of said plurality of client computers having a stored characteristic value that matches said desired characteristic value, and store the unique identifiers of the matched client computers in a group list;
    assign a time frame, and, within that time frame send the desired program from the second database to the client computers whose unique identifiers are in the group list;
    record instances of programs being sent to client computers, wherein said instance record comprises the name of the program, the program version, the client computer, and the date and time of the sending; and
    track recorded instances of programs sent to client computers so as to verify that sending such programs is in compliance with license obligations.

8. The apparatus of claim 7, wherein the processor is further configured to send a notification to the client computers whose unique identifiers are in the group list, where said notification includes the assigned time frame.

9. The apparatus of claim 7, wherein the second database is located in an enterprise different from the enterprise associated with the client computers.

10. A computer article comprising a computer-readable storage medium that stores executable instructions for causing a computer system to:
    access a first database containing for each of a plurality of client computers a unique identifier and at least one characteristic;
    access a second database containing a plurality of programs;
    receive a program request, said program request including a desired value for a specified characteristic and a desired program, wherein said specified characteristic is stored in the first database and said desired program is stored in the second database;
    query said first database to identify one or more of said plurality of client computers having a stored characteristic value that matches said desired characteristic value, and store the unique identifiers of the matched client computers in a group list;
    assign a time frame, and, within that time frame send the desired program from the second database to the client computers whose unique identifiers are in the group list;
    record instances of programs being sent to client computers, wherein said instance record comprises the name of the program, the program version, the client computer, and the date and time of the sending; and
    track recorded instances of programs sent to client computers so as to verify that sending such programs is in compliance with license obligations.

11. The article of claim 10, comprising instructions for further causing the computer to update the second database to indicate the client computer that has received a program.

12. A method comprising:
for each of a plurality of client computers, storing a unique identifier, client computer hardware configuration data, and at least one characteristic in a database;
receiving a computing platform request, said computing platform request including a desired value for a specified characteristic and a desired computing platform, wherein said specified characteristic is stored in the database;
the management server querying the database to identify one or more of said plurality of client computers having a stored characteristic that matches said desired characteristic value, and storing the unique identifiers of said matched client computers in a group list;
recording instances of computing platforms being sent to client computers, wherein said instance record comprises the name of the computing platform, the computing platform version, the client computer, and the date and time of the sending;
tracking recorded instances of computing platforms being sent to client computers so as to verify that sending such computing platforms is in compliance with license obligations; and
sending to the client computers whose unique identifiers are in the group list the desired computing platform by:
determining a computing platform image based on said client computer hardware configuration data, wherein said platform image comprises a hardware independent portion and a hardware dependent portion;
sending the hardware independent portion; and
sending the hardware dependent portion.

13. The method of claim 12, further comprising modifying the hardware independent portion based on client computer requirements.

14. A computer apparatus comprising: a memory; and a processor coupled to the memory, wherein the processor is configured to:
access a database containing for each of a plurality of client computers a unique identifier, client computer hardware configuration data, and at least one characteristic;
receive a computing platform request, the request including a desired value for a specified characteristic and a desired computing platform, wherein said specified characteristic is stored in the database;
query the database to identify one or more of said plurality of client computers having a stored characteristic value that matches said desired characteristic value, and store the unique identifiers of the matched client computers in a group list;
record instances of computing platform being sent to client computers, wherein said instance record comprises the name of the computing platform, the computing platform version, the client computer, and the date and time of the sending;
track recorded instances of computing platforms being sent to client computers so as to verify that sending such programs is in compliance with license obligations;
send to the client computers whose unique identifiers are in the group list the desired computing platform, where the processor is further configured to:
determine a computing platform image based on said client computer hardware configuration data, wherein said platform image comprises a hardware independent portion and a hardware dependent portion;
send the hardware independent portion; and
send the hardware dependent portion.

15. The apparatus of claim 14, wherein the computing platform includes a program to determine the hardware configuration of the client computers.

16. The apparatus of claim 14, wherein the hardware independent portion of the computing platform image is created by installing an operating system and application programs onto a test computer.

17. A computer article comprising a computer-readable storage medium that stores executable instructions for causing a computer system to:
access a database containing for each of a plurality of client computers a unique identifier, client computer hardware configuration data, and at least one characteristic;
receive a computing platform request, the request including a desired value for a specified characteristic and a desired computing platform, wherein said specified characteristic is stored in the database;
record instances of computing platforms being sent to client computers, wherein said instance record comprises the name of the computing platform, the computing platform version, the client computer, and the date and time of the sending;
track recorded instances of computing platforms being sent to client computers so as to verify that sending such computing platforms is in compliance with license obligations; and
send to the client computers whose unique identifiers are in the group list the computing platform, where the article comprises further instructions to:
determine a computing platform image based on said client computer hardware configuration data, wherein said platform image comprises a hardware independent portion and a hardware dependent portion;
send the hardware independent portion; and
send the hardware dependent portion.

18. The article of claim 17, comprising instructions for further causing the computer to modify the hardware independent software image based on client computer requirements.

* * * * *